United States Patent
Cook et al.

(10) Patent No.: US 9,913,430 B2
(45) Date of Patent: Mar. 13, 2018

(54) POWER TAKEOFF DRIVE ASSEMBLY FOR A CORN HEADER OF AN AGRICULTURAL HARVESTER

(71) Applicant: CNH Industrial America LLC, New Holland, PA (US)

(72) Inventors: Joel Timothy Cook, Lititz, PA (US); Andrew V. Lauwers, Stevens, PA (US)

(73) Assignee: CNH Industrial America LLC, New Holland, PA (US)

(*) Notice: Subject to any disclaimer, the term of this patent is extended or adjusted under 35 U.S.C. 154(b) by 75 days.

(21) Appl. No.: 14/486,101

(22) Filed: Sep. 15, 2014

(65) Prior Publication Data

US 2016/0073585 A1 Mar. 17, 2016

(51) Int. Cl.
*A01D 69/00* (2006.01)
*A01D 41/14* (2006.01)
*A01D 45/02* (2006.01)
*A01D 69/06* (2006.01)

(52) U.S. Cl.
CPC ......... *A01D 69/002* (2013.01); *A01D 41/142* (2013.01); *A01D 45/021* (2013.01); *A01D 45/028* (2013.01); *A01D 69/06* (2013.01)

(58) Field of Classification Search
CPC .... A01D 69/002; A01D 69/06; A01D 45/021; A01D 45/028; A01D 41/142; A01D 34/30; A01D 34/32; A01D 34/475; A01D 43/105
See application file for complete search history.

(56) References Cited

U.S. PATENT DOCUMENTS

| 2,442,520 | A | | 6/1948 | Van Sickle | |
|---|---|---|---|---|---|
| 3,174,266 | A | * | 3/1965 | Hoeksema | A01D 45/021 56/106 |
| 3,271,940 | A | * | 9/1966 | Ashton | A01D 41/141 56/105 |
| 3,585,789 | A | * | 6/1971 | Blanshine | A01D 43/082 56/106 |

(Continued)

FOREIGN PATENT DOCUMENTS

| DE | 102012015932 | * | 5/2015 | ............ A01D 41/14 |
|---|---|---|---|---|
| EP | 1466518 A2 | | 10/2004 | |

*Primary Examiner* — Alicia Torres
*Assistant Examiner* — Adam J Behrens
(74) *Attorney, Agent, or Firm* — Peter K. Zacharias; Patrick M. Sheldrake (57) ABSTRACT

A corn header for an agricultural harvester is disclosed. The header includes a chassis having first and second lateral ends and a plurality of row units defining crop receiving gaps. The header further includes a power takeoff member having a first end operatively connected to the agricultural harvester. A plurality of chopping units is carried by the chassis adjacent the row units, each chopping unit including a rotating blade configured to span a crop receiving gap of the row unit. A drive assembly including a gearbox, driveshaft and secondary gearbox is operably connected to the second end of the power takeoff member. The drive shaft extends from the gearbox to the secondary gearbox disposed between the first and second lateral ends of the chassis. The drive shaft is operably connected to a rotating line shaft of the row units or the chopping units via the secondary gearbox.

17 Claims, 10 Drawing Sheets

(56) References Cited

U.S. PATENT DOCUMENTS

| | | | | |
|---|---|---|---|---|
| RE27,554 E * | 1/1973 | Ashton | ................ | A01D 45/021 56/105 |
| 4,204,387 A | 5/1980 | Eistert et al. | | |
| 4,476,667 A * | 10/1984 | Moss | ................ | A01D 45/021 56/106 |
| 4,771,592 A * | 9/1988 | Krone | ................ | A01D 43/083 56/119 |
| 5,099,635 A * | 3/1992 | Butkovich | ............ | A01D 46/08 56/13.5 |
| 5,473,872 A * | 12/1995 | Fox | ...................... | A01D 41/142 180/53.1 |
| 5,704,202 A * | 1/1998 | Calmer | ................ | A01D 45/023 56/106 |
| 6,073,429 A * | 6/2000 | Wuebbels | ............ | A01D 43/082 56/11.3 |
| 6,247,296 B1 * | 6/2001 | Becker | ................ | A01D 41/142 460/20 |
| 6,370,853 B1 * | 4/2002 | Randall | ................ | A01F 15/08 100/41 |
| 6,381,934 B2 | 5/2002 | Heard | | |
| 6,412,259 B1 * | 7/2002 | Wiegert | ............... | A01D 45/025 56/60 |
| 6,425,232 B1 * | 7/2002 | Desnijder | ............ | A01D 43/086 241/101.763 |
| 7,234,291 B2 * | 6/2007 | Rickert | ................ | A01D 69/00 56/12.6 |
| 7,937,918 B1 * | 5/2011 | Mossman | .............. | A01D 43/08 56/11.7 |
| 8,534,036 B2 * | 9/2013 | Zegota | ................ | A01D 45/021 56/10.8 |
| 9,198,351 B2 * | 12/2015 | Tilly | .................... | A01D 45/021 |
| 2004/0060271 A1 * | 4/2004 | Ameye | .................. | A01F 29/14 56/10.8 |
| 2004/0187461 A1 * | 9/2004 | Rickert | ................ | A01D 69/00 56/14.2 |
| 2005/0279073 A1 * | 12/2005 | Clauss | ................. | A01D 41/142 56/364 |
| 2006/0042217 A1 * | 3/2006 | Buermann | ........... | A01D 41/142 56/257 |
| 2007/0197327 A1 * | 8/2007 | Arnold | ................. | A01D 45/021 474/152 |
| 2008/0184689 A1 * | 8/2008 | Lohrentz | ............. | A01D 41/142 56/11.9 |
| 2008/0276590 A1 * | 11/2008 | Sauerwein | ............ | A01D 41/14 56/153 |
| 2010/0300057 A1 * | 12/2010 | Luetke-Harmann | . | A01D 45/025 56/119 |
| 2013/0014483 A1 * | 1/2013 | Luetke-Harmann | . | A01D 45/025 56/119 |
| 2014/0020355 A1 * | 1/2014 | Tilly | .................... | A01D 45/021 56/103 |

\* cited by examiner

POWER TAKEOFF DRIVE ASSEMBLY FOR A CORN HEADER OF AN AGRICULTURAL HARVESTER

BACKGROUND

The subject application relates generally to corn headers for use with agricultural harvesters. In particular, the subject application relates to a power takeoff drive assembly for a corn header of an agricultural harvester.

Agricultural harvesters such as combines that harvest corn are provided with headers including row dividers for directing rows of corn stalks to ear separation chambers or row units comprising stripping plates (or deck plates) defining a stalk receiving slot or gap therebetween. The row units further include snapping rolls (or stalk rolls) located beneath the deck plates and endless gathering chains located above the deck plates. As the combine traverses a field, the row dividers divide the stalks into rows of individual stalks which are pulled downwardly by the rotating stalk rolls. The downward pulling of the stalks by the stalk rolls causes the ears of corn to forcefully strike the deck plates whereupon they are snapped off the stalks. The gathering chains run fore to aft along the row units and transport the stripped corn to a conveyor for conveying the harvested corn to a feederhouse of the combine. Harvested corn is then processed to the combine's inner chambers for downstream processing. Stalks stripped of corn by the row units are commonly processed by chopping units having cutting blades located beneath the stalk rolls that chop the stalks, leaves, etc. (also known as "material other than grain" or "MOG") into finer pieces which are then distributed onto the field being harvested.

Many conventional systems drive both the row units and chopping units by a single rotating cross shaft or line shaft that derives its power from a power takeoff (PTO) connected to the drive train of the combine. That is, the moving parts of the row units, e.g., the stalk rolls and gathering chains, as well as the cutting blades of the chopping units are driven by a single line shaft. The number of row units and chopping units a single line shaft can drive is limited by the size, e.g., diameter, of the line shaft and the line shaft rotational speed. On larger headers, e.g., those having twelve or more row units, the power from the combine and PTO is run laterally outwardly across the rear of the header to the lateral ends of the header, then forwardly to the front of the header and then back to the center of the header via the line shaft. On conventional larger headers, therefore, this arrangement requires two drives, one on each end of the header for delivering power from the rear of the header to the front thereof. However, the provision of gearboxes on opposite ends of the header increases the width of the header. In so doing, the width of the header is greater than would otherwise be desirable as is the number of parts necessary to rotate the line shaft(s).

BRIEF SUMMARY

In accordance with a first aspect, the subject application provides a header for an agricultural harvester. The header includes a chassis, a plurality of row units carried by the chassis, first and second power takeoff members extending from the harvester drive system and a drive assembly. The header may optionally include a plurality of chopping units. Each row unit includes deck plates defining a crop receiving gap therebetween, a gathering chain drive sprocket rotatably carried by the row unit above the deck plates, and a stalk roll rotatably carried by the row unit beneath the deck plates. Each of the power takeoff members has a first end operatively connected to the agricultural harvester drive system and a second end. The drive assembly includes a first gearbox, a first drive shaft, a third gearbox and a second drive shaft. The first gearbox is operably connected to the second end of the first power takeoff member and the first drive shaft extends from the first gearbox to a second gearbox disposed between first and second lateral ends of the chassis. The second gearbox is operably connected to a first rotating line shaft. If present, the plurality of chopping units is carried by the chassis adjacent the row units. The plurality of chopping units includes blades configured to span the crop receiving gaps. The third gearbox is operably connected to the second end of the second power takeoff member from the harvester drive system and the second drive shaft extends from the third gearbox to a fourth gearbox disposed between the first and second lateral ends of the chassis. The fourth gearbox is operably connected to a second rotating line shaft.

In accordance with a second aspect, the subject application provides a header for an agricultural harvester. The header includes a chassis, a plurality of row units, a power takeoff member and a drive assembly. The header may also include a plurality of optional chopping units. The chassis includes first and second lateral ends and the plurality of row units is carried by the chassis. Each row unit includes deck plates defining a crop receiving gap therebetween, a gathering chain drive sprocket rotatably carried by the row unit above the deck plates, and a stalk roll rotatably carried by the row unit beneath the deck plates. The power takeoff member includes a first end operatively connected to the agricultural harvester drive system. The chopping units each include blades configured to span the crop receiving gaps. The drive assembly includes a gearbox that is operably connected to the second end of the power takeoff member and a drive shaft that extends from the gearbox to a secondary gearbox disposed between the first and second lateral ends of the chassis. The drive shaft is operably connected to a rotating line shaft.

In accordance with a third aspect, the subject application provides a header for an agricultural harvester comprising a chassis, a plurality of row units, a plurality of optional chopping units, first and second power takeoff members and a drive assembly. The chassis includes first and second lateral ends. The plurality of row units is carried by the chassis and each row unit includes deck plates defining a crop receiving gap therebetween. A gathering chain drive sprocket is rotatably carried by the row unit above the deck plates and a stalk roll is rotatably carried by the row unit beneath the deck plates. The plurality of chopping units is carried by the chassis adjacent the row units and includes blades configured to span the crop receiving gaps. The first power takeoff member includes a first end operatively connected to the agricultural harvester drive system. The drive assembly includes a first gearbox that is operably connected to the second end of the first power takeoff member and a first drive shaft that extends from the first gearbox to a second gearbox disposed between the first and second lateral ends of the chassis. The second gearbox is operably connected to a first rotating line shaft that drives the gathering chain drive sprockets and the stalk rolls. The second power takeoff member includes a first end operatively connected to the agricultural harvester drive system. The drive assembly further includes a third gearbox that is operably connected to the second end of the second power takeoff member and a second drive shaft that extends from the third gearbox to a fourth gearbox disposed between the first and second lateral ends of the chassis. The fourth gearbox is operably connected to a second rotating line shaft that drives the chopping units.

In accordance with a fourth aspect, the subject application provides a header wherein the power from the combine to the header is provided by a power takeoff member extending from the combine feederhouse to the header. A gearbox operably connected to the power takeoff member transmits power from the power takeoff member to the first end of a drive shaft extending from the output of the gearbox toward the center of the header. A second end of the drive shaft is connected to the input of a secondary gearbox. The output of the secondary gearbox is configured to drive a row unit line shaft or a chopping unit line shaft outwardly from a point between the ends of the header to maximize the number of row units or chopping units that can be driven from the secondary gearbox. That is, the secondary gearbox is disposed between opposite ends of the header and is used to drive either the row unit line shaft or the chopping unit line shaft as opposed to two separate gearboxes positioned on opposite ends of the row unit or chopping unit line shafts. According to an aspect, the row unit drive power can be derived from a power takeoff member provided at one side of the combine feederhouse and the chopping unit drive power can be derived from a power takeoff member provided at the opposite side of the combine feederhouse. The gearbox and the secondary gearbox can be spur gearboxes, bevel gearboxes, continuously variable transmissions (CVTs) or chain cases, any and/or all of which are generally referred to herein as "gearboxes."

According to an aspect, representative configurations of the gearbox and secondary gearbox can include, without limitation, two-spur gear gearboxes, three-spur gear gearboxes, bevel gearboxes, continuously variable transmissions or chain cases between which the row unit drive shaft or the chopping unit drive shaft extends. A simple configuration can be constructed as two substantially identical spur gearboxes in opposing relationship, e.g., a pair of spur gearboxes with two gears inside each gearbox and a row unit drive shaft or chopping unit drive shaft extending therebetween, although spur gearboxes with three or more gears or bevel gearboxes could be used. In a representative but non-limitative example, a gearbox operatively connected to the power takeoff member may be disposed rearwardly of a secondary gearbox connected to either the row unit line shaft or the chopping unit line shaft. In such an arrangement, the drive shaft connecting the gearbox to the secondary gearbox may extend at an acute angle with respect to either the row unit line shaft or the chopping unit line shaft. In order to minimize the distance the drive shaft extends forwardly from the gearbox to the secondary gearbox, the gearboxes may be constructed and arranged such that the drive shaft connecting the output of the gearbox to the input of the secondary gearbox extends essentially parallel to the row unit line shaft or the chopping unit line shaft. Moreover, the speed and angle of the drive shaft can be optimized for the power required to rotate the line shaft by changing the number of gears, sizes of gears (gear ratios), or the types of gears, e.g., spur or bevel.

By placing the row unit and chopping unit line shaft drive gearboxes between the ends of the header, the number of row units and associated chopping units that can be driven can be maximized while limiting the number of drive components, thereby simplifying construction and operation of the header. Additionally, the drive system connects either the row unit drive shaft to the row unit line shaft or the chopping unit drive shaft to the chopping unit line shaft at a first location or a second location between the ends of the header depending on whether the number of row units carried by the header is even or odd. That is, although not limited thereto, the first location could be at or near the center of the header for even row unit count headers (8, 12, 16, etc.) and the second location can be offset approximately one row unit width from the center of the header for odd row unit count headers (5, 7, 9, etc.). Further, by running the row unit and chopping unit drives toward the center rather than to the ends of the header, a header of narrower width and greater clearance to adjacent standing rows of crop is achieved. That is, the header according to the subject application is narrower relative to current header designs because current headers have row unit and chopping unit drives located outside the harvested width whereas the subject headers have the drives located within the harvested width. Thus, there is less likelihood that the laterally outermost row dividers might cause damage to adjacent rows of crop thereby resulting in increased crop yield.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Figure 1:
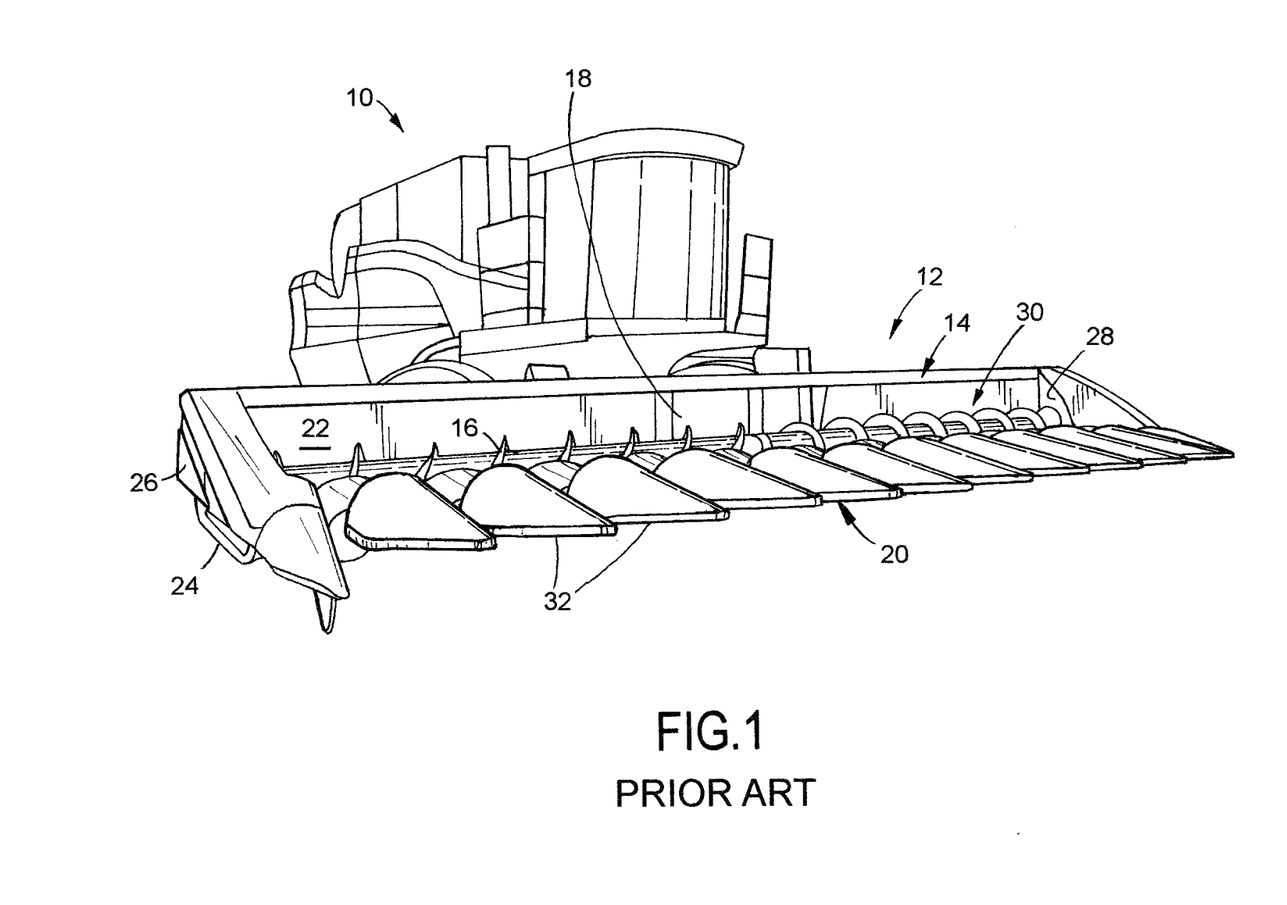
FIG. 1 is a perspective view of an agricultural combine including a conventional corn header.

Referring now to the drawings, wherein aspects of the subject application are shown, FIG. 1 illustrates a typical agricultural harvester or combine harvester 10 to which a corn head assembly (or corn header) 12 is operatively connected. The corn head assembly 12 includes a frame or chassis 14 for mounting to a forward end of the combine harvester 10, a conveyor 16 (such as an auger) extending lengthwise across the chassis 14 for conveying crop material to a combine feeding location or feederhouse 18, and a plurality of row units 20 extending forwardly from the chassis 14. The conveyor 16 can be a screw auger conveyor, but can alternatively be any conveyor capable of moving grain, such as a paddle system, a conveyor belt, a pressure based system, or any combination thereof. Such conveyors are known in the art and a further detailed description of their structure, function and operation is not necessary for a complete understanding of the subject application. The feederhouse 18 transports the harvested crop e.g., corn for downstream processing within the combine. Such feederhouses and harvesting structures and operations are known in the art and a further detailed description of their structure, function and operation is not necessary for a complete understanding of the subject application.

The chassis 14 can be configured as a substantially rectangular frame, as shown. However, the chassis 14 may be configured as any shape suitable for the foregoing intended use. The chassis 14 includes a rear wall 22, a bottom wall 24 and a pair of side walls 26, 28. As shown in FIG. 1, the chassis 14 can be connected to a forward end of the combine harvester 10. Alternatively, the chassis 14 can be connected to any device that has use for a corn head assembly 12. The chassis 14 further includes a channel 30 formed partially by the bottom wall 24. During operation of header 12, crop material is stripped from the stalks by the cooperative action of row unit stripping plates or deck plates and stripping rolls or stalk rolls, discussed below. The stripped crop material is then transported to the channel 30 by the continuous movement of endless gathering chains, also discussed below. Upon reaching the channel 30, the conveyor 16 conveys harvested crop to the combine feeding location or feederhouse 18 located proximate a midpoint of the channel 30.

Still referring to FIG. 1, it is illustrated that each of the plurality of row units 20 includes a row divider 32. The row divider 32 extends forwardly from the chassis 14 and extends across a pair of adjacent row units 20. The row divider 32 directs a row of corn stalk towards the aforementioned snapping rolls and stripping plates that are situated between adjacent row dividers. As is known, the snapping rolls pull the stalk downwardly snapping ears of corn when they strike the stripping plates. The snapping rolls desirably pull most of the trash or MOG down and out of the header where it may be further processed by chopping units in the manner described below.

Figure 2:
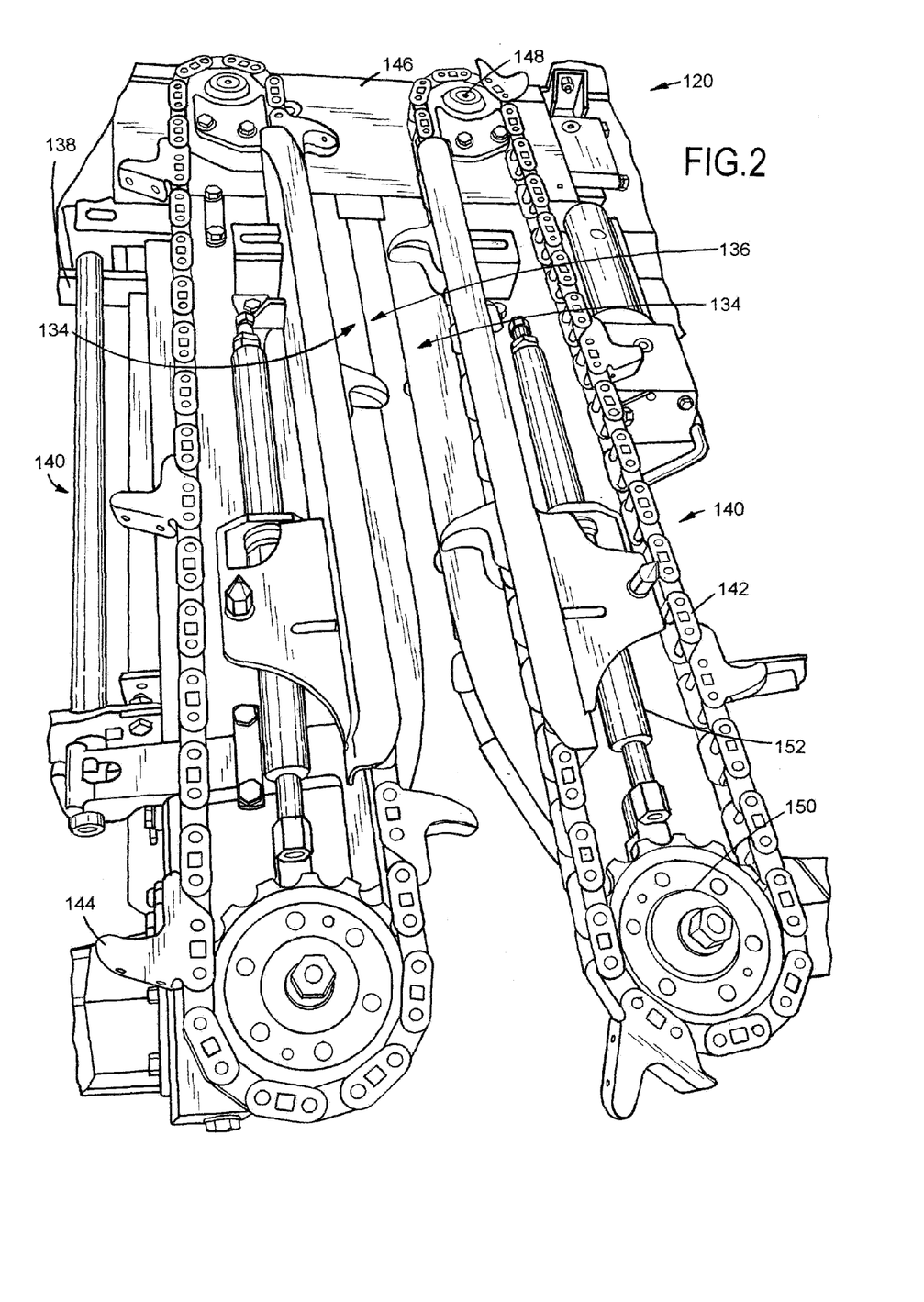
FIG. 2 is a top perspective view of a row unit of a corn header constructed in accordance with the subject application with certain elements omitted for clarity of illustration.

FIG. 2 illustrates certain details of a row unit 120 according to an aspect of the subject application. In particular, row unit 120 comprises a pair of opposed stripping plates or deck plates 134 which define a crop receiving slot or gap 136 therebetween. Each row unit 120 includes a row unit frame 138 having a pair of row unit arms 140 connected to a chassis or frame of the header. Mounted lengthwise on each row unit arm 140 is an endless gathering chain 142 situated above the deck plates 134 having lugs 144 that direct corn stalks to the rear of the row unit 120 for the removal of corn ears from the stalks by the deck plates 134. In operation, crop material is stripped from the stalk and then travels across a breast plate 146 to a channel similar to channel 30 of FIG. 1. The crop material stripped from the stalk is propelled rearwardly to the channel due to the continuous flow of harvested crop material flowing rearwardly as a result of the actions of the gathering chains 142.

Each gathering chain 142 is entrained about a drive sprocket 148 disposed at a proximal end of a respective row unit arm 140 and a driven sprocket 150 located at a distal end of a respective row unit arm. The gathering chain 142, drive sprocket 148 and driven sprocket 150 are situated above the deck plates 134. As will be described in greater detail later herein, the drive sprocket 148 is rotated by gearing operatively connected to the drive train of the combine and rotation of the drive sprocket 148 causes corresponding rotation of the driven sprocket 150. Biasing members 152 such as springs, extensible cylinders or the like are provided to exert forwardly directed force against the driven sprockets 150 in order to maintain tension in the gathering chains 142 during operation of the header. Rotation of the drive sprockets 148 and stalk rolls 154 (FIG. 3) of the row units 120 is driven by rotation of a row unit line shaft which derives its motive power from a power takeoff member and drive assembly extending from the drive train of the combine, as further described below.

Figure 3:
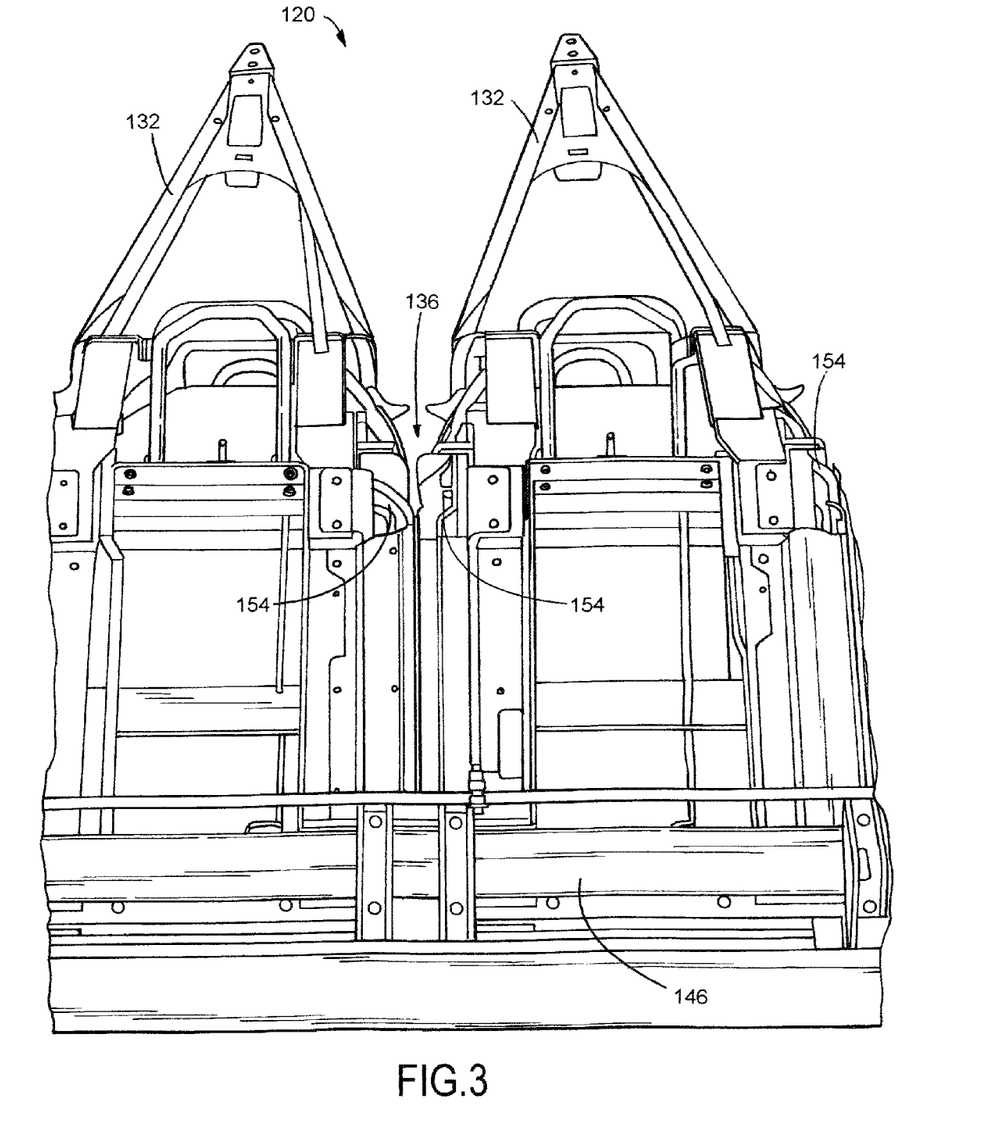
FIG. 3 is a bottom view of a row unit of a corn header constructed in accordance with the subject application with certain elements omitted for clarity of illustration.

Referring to FIG. 3, there is shown a bottom view of row unit 120 which includes row dividers 132. During harvesting operations, the row dividers 132 direct a row of corn stalk toward the deck plates 134 described above in connection with FIG. 2. As the stalk reaches the deck plates by passing through the stalk receiving gap 136 it is engaged by a pair of opposed rotating snapping rolls or stalk rolls 154 situated beneath the deck plates. As noted above, the stalk rolls 154 engage the corn stalk and pull the stalk downwardly whereby the corn ears strike the deck plates and are stripped from the stalk.

Figure 4:
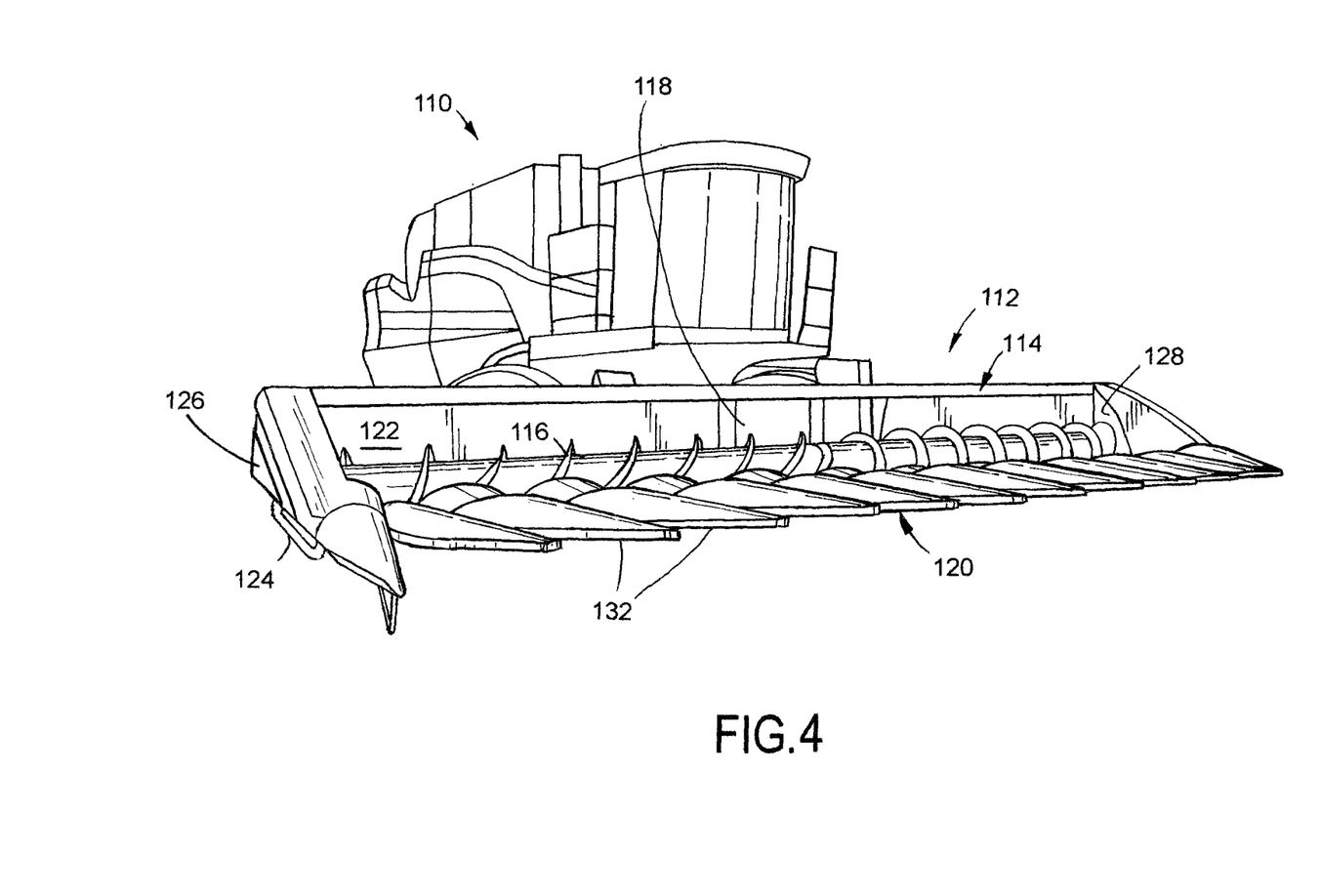
FIG. 4 is a perspective view of an agricultural combine including a corn header constructed in accordance with the subject application.
Figure 5:
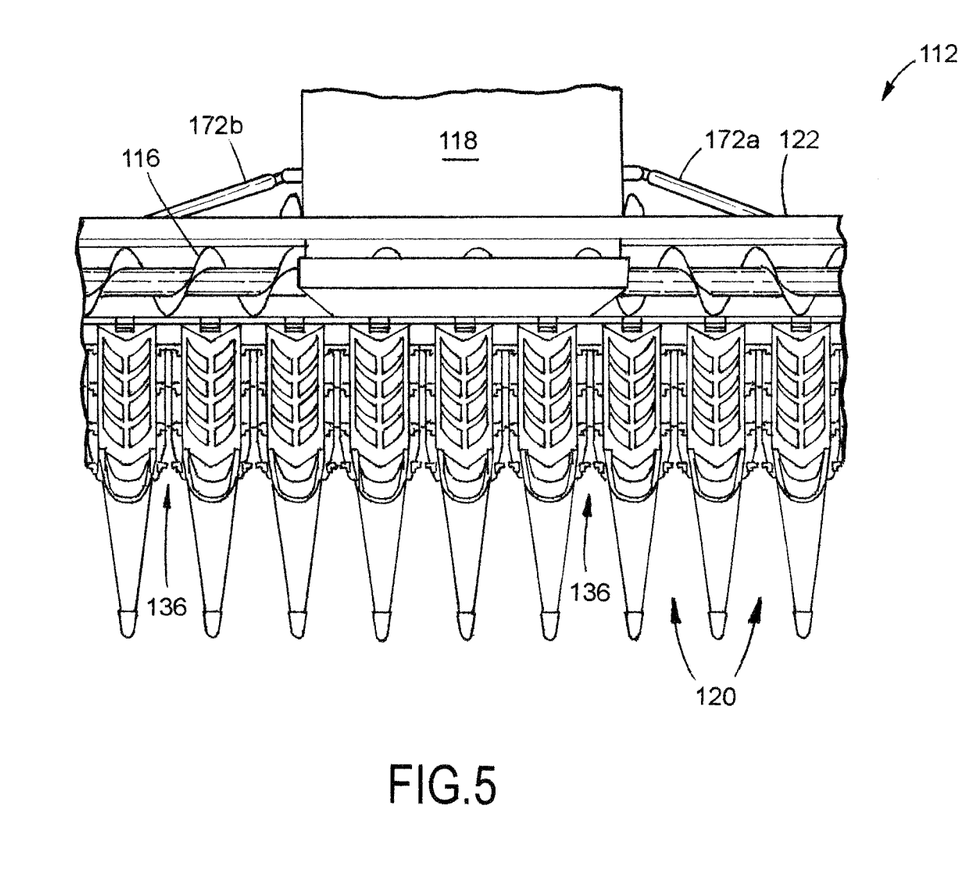
FIG. 5 is a top plan view of a portion of the corn header of FIG. 4.

FIGS. 4 and 5 illustrate a header 112 according to an aspect of the subject application, which header is attachable to an agricultural harvester or combine 110 (FIG. 4). In many respects, header 112 shares common structural features with header 12 of FIG. 1. For example, header 112 includes a frame or chassis 114 for mounting to a forward end of the combine harvester 110, a conveyor 116 (such as an auger) extending lengthwise across the chassis 114 for conveying crop material to a combine feeding location or feederhouse 118, and a plurality of row units 120 extending forwardly from the chassis 114 wherein each of the row units is separated by a pair of row dividers 132 leading to a stalk receiving gap 136. The chassis 114 includes a rear wall 122, a bottom wall 124 and a pair of side walls 126, 128. The side walls 126, 128 are positioned inwardly of the end row dividers. That is, the side walls 126, 128 are positioned closer to the center of the header than the outermost row dividers. Constructed and arranged as such, the side walls 126, 128 are spaced at a greater distance from an adjacent standing row of crop during harvesting operations than compared to conventional harvesters, e.g., as shown in FIG. 1. In other words, owing to the positioning of the side walls 126, 128 the overall width of the header is reduced compared to the width of conventional headers. Consequently, there is a reduced likelihood that the side walls 126, 128 will contact and therefore damage adjacent rows of crop during harvesting operations. Further, as discussed in greater detail below, by positioning row unit and chopping unit line shaft gearboxes interiorly of the ends of the header, approximately one half the power is needed to drive the line shaft out each side of the gearbox to the ends of the header versus a typical line shaft which is driven from the ends of the lineshaft at the end of the header.

Header 112 is equipped with one or more power takeoff members, depicted by reference numerals 172a, 172b in FIG. 5, which derive their motive power from one or more combine drive systems as described below in connection with FIGS. 8A and 8B. As will be described in greater detail hereinafter, the power takeoff member(s) 172a and/or 172b are connected to gearbox(es) that rotate drive shaft(s) which, in turn drive gearbox(es) connected to line shaft(s) which drive the moving parts of row units 120 and/or optional chopping units 158 discussed below in connection with FIG. 6.

Figure 6:
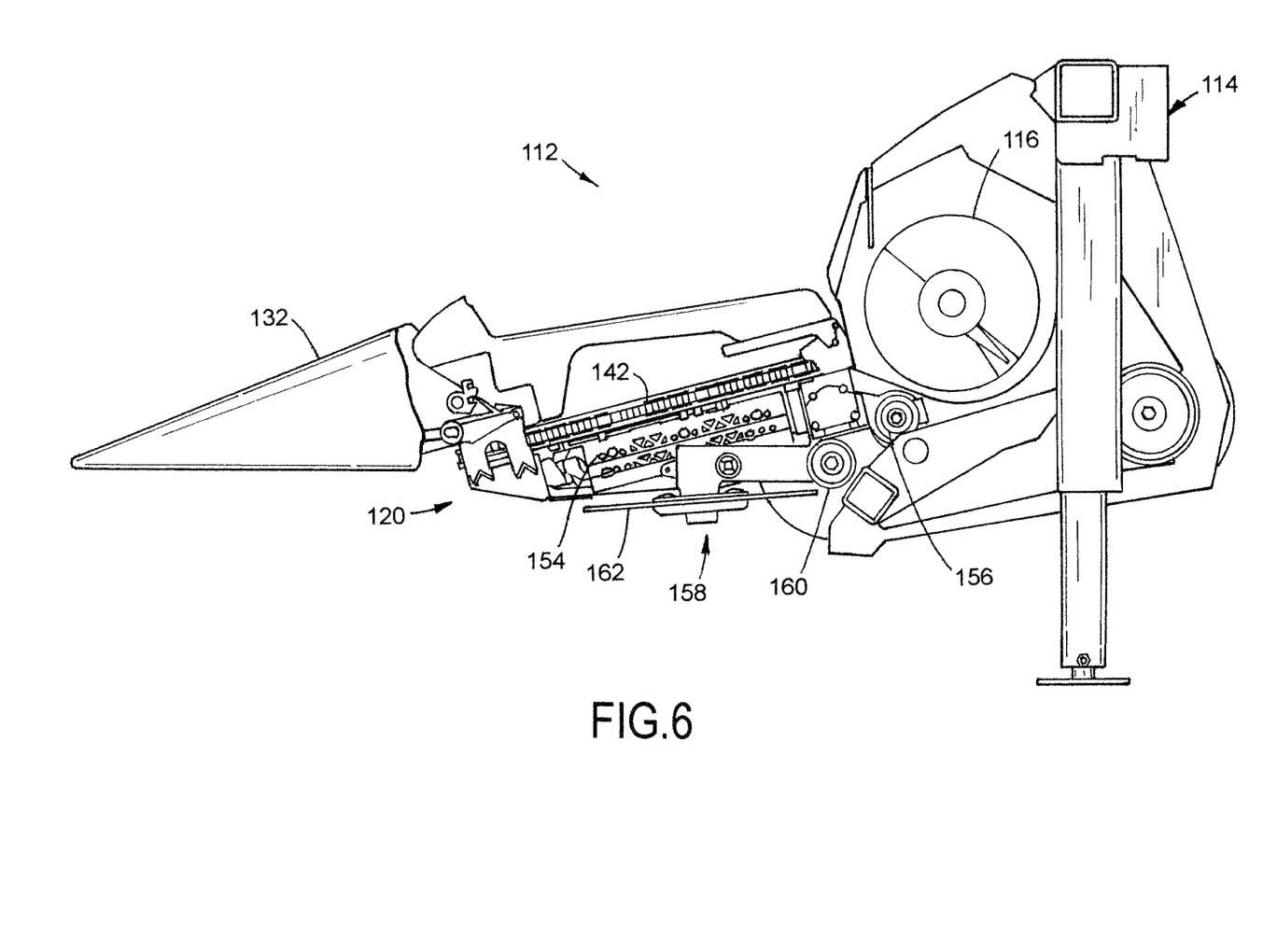
FIG. 6 is a side elevation view of the corn header of FIG. 4 with certain elements omitted for clarity of illustration.

Referring to FIG. 6, there is shown in side elevation view header 112 constructed in accordance with the subject application. Header 112 includes a plurality of row units 120 (only one of which is illustrated) which are operatively connected to one another by a first rotating line shaft, e.g., line shaft 156 that rotatably drives the gathering chains 142 and stalk rolls 154 of the row units. In addition, header 112 includes a plurality of chopping units 158 (only one of which is illustrated) which are operatively connected to one another by a second rotating line shaft, e.g., line shaft 160 that rotatably drives chopping blades 162 of the chopping units 158. It will be understood that, in the alternative, line shaft 156 may drive the chopping blades of the chopping units and line shaft 160 may drive the gathering chains and stalk rolls of the row units. It will be further understood that the gathering chains and the stalk rolls of the row units may be driven by separate line shafts that are rotated by power takeoff assemblies in accordance with the subject application whereby the rotational speeds of the gathering chain drive sprockets and the stalk rolls may be independently controlled by the combine operator.

Figure 7:
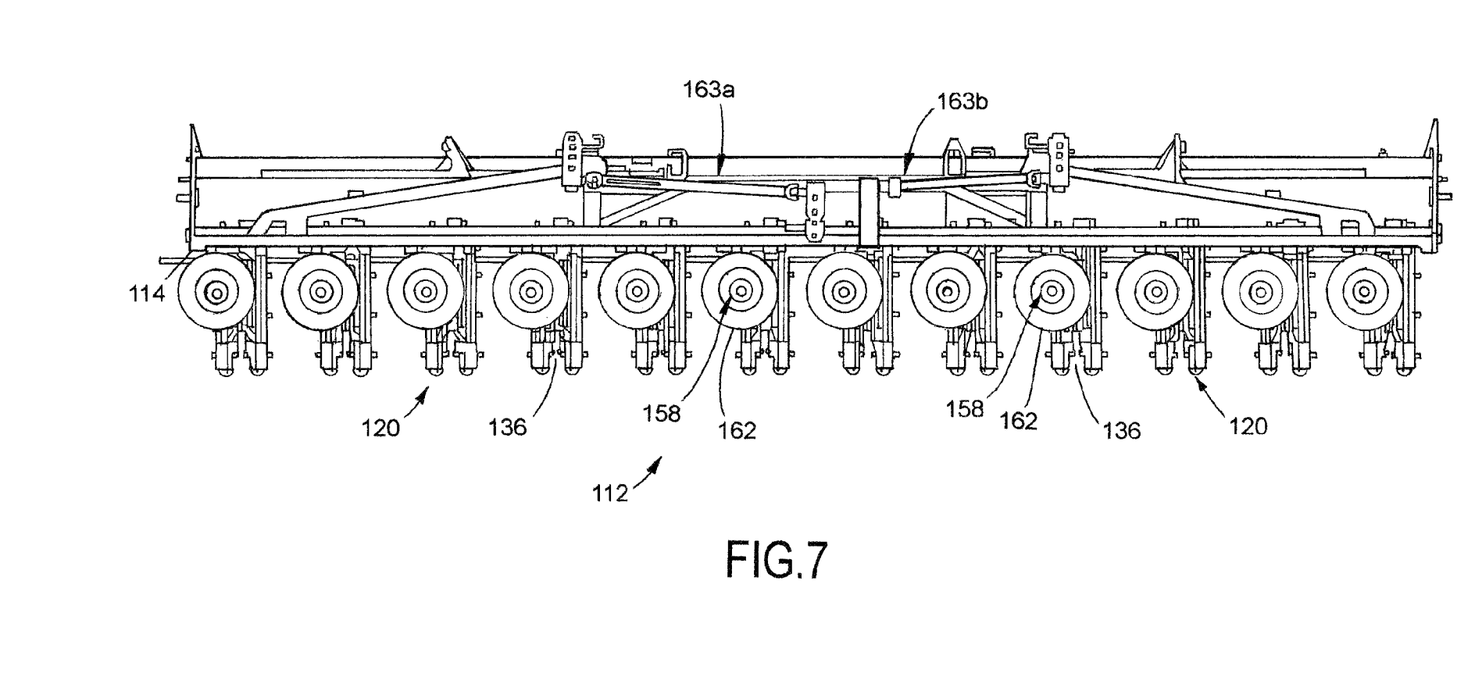
FIG. 7 is a bottom view of the corn header of FIG. 4 with certain elements omitted for clarity of illustration.
Figure 8:
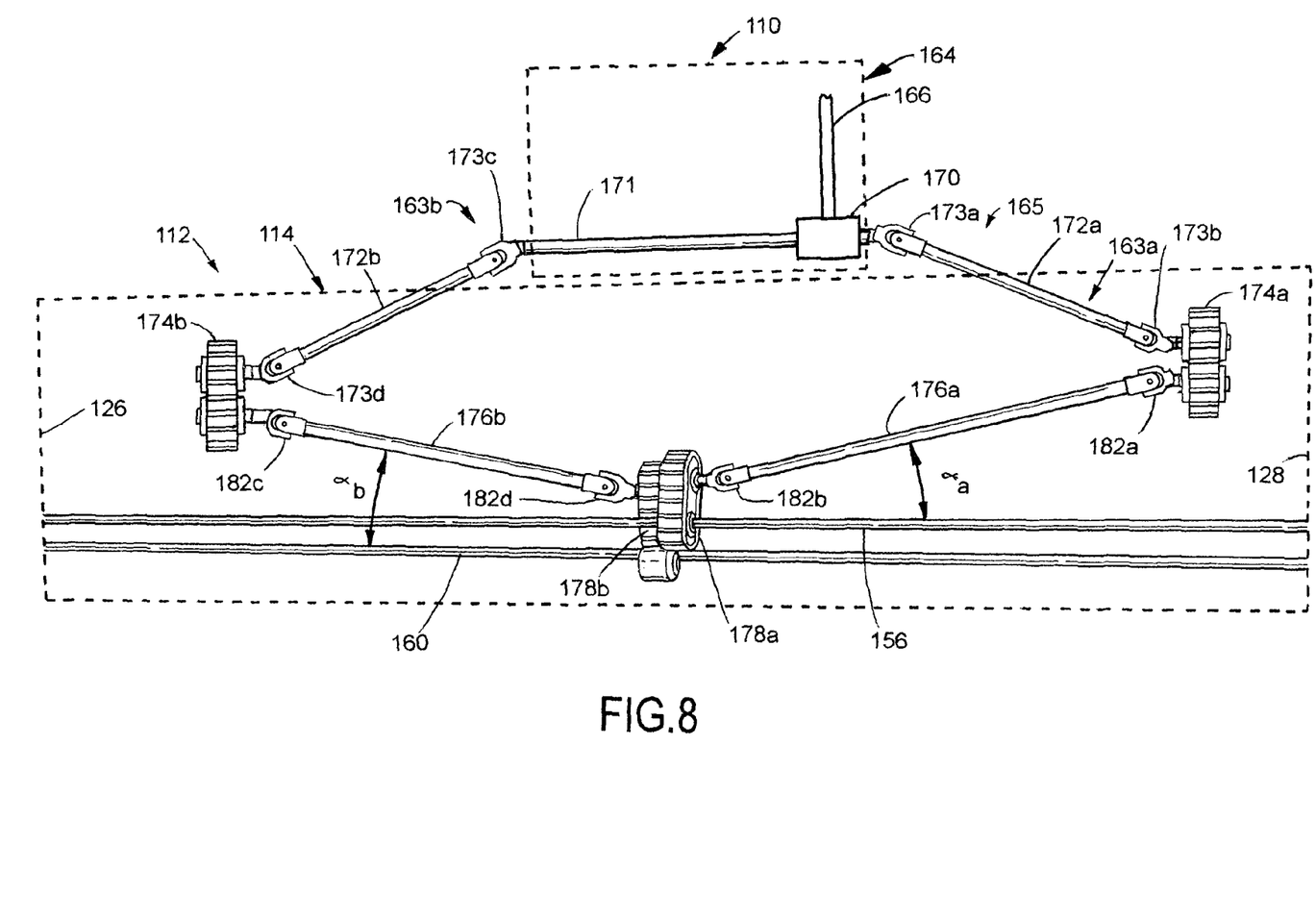
FIG. 8 is a perspective view of a drive train of the corn header of FIG. 4.

Referring to FIG. 7, there is shown a bottom view of header 112 constructed according to the subject application but with the row dividers thereof omitted for clarity of illustration. As discussed above, header 112 comprises frame or chassis 114, a plurality of row units 120 and a plurality of chopping units 158 situated adjacent the row units. The plurality of chopping units 158 includes blades 162 configured to span the crop receiving gaps 136 of the row units 120 whereby MOG that is pulled down by the stalk rolls is chopped or processed by the chopping unit blades. Generally shown in FIG. 7 and described in greater detail in FIG. 8, are the drive trains of header 112 which drive the moving parts of the row units 120 and chopping units 158. As depicted in FIG. 7, header 112 includes a row unit drive train assembly 163a and a chopping unit drive train assembly 163b. As described below in connection with FIG. 8, each of the drive train assemblies 163a and 163b include a gearbox operatively connected to the second end of a power takeoff member that is attached to an output of a combine harvester drive system 164, a drive shaft driven by the gearbox, and a secondary gearbox situated between the ends of the header and driven by the drive shaft.

FIG. 8 shows in perspective view a representative but non-limitative drive assembly 165 including drive train assemblies 163a and 163b for driving the moving parts of the above-described row units and chopping units 120, 158 (FIG. 7). In particular, FIG. 8 depicts combine drive system 164 including a drive system member 166 drivingly connected to a gearbox 170. Gearbox 170 may contain cooperating gears such as bevel gears which drivingly rotate power takeoff members 172a, 172b connected to a first gearbox 174a and a third gearbox 174b, respectively. A cross shaft 171 is provided which links gearbox 170 to power takeoff member 172b. That is, through gearbox 170, cross shaft 171 and power takeoff members 172a, 172b, the first and third gearboxes 174a and 174b are respectively and operably connected to the combine harvester drive system 164.

FIG. 8 additionally shows that a first power takeoff member 172a can be pivotably connected to gearbox 170 and the first gearbox 174a. Similarly, a second power takeoff member 172b can be pivotably connected to cross shaft 171 and the third gearbox 174b. Such pivotable connections may be achieved e.g., by way of universal joints. According to an aspect, a first universal joint 173a can connect a first end of the first power takeoff member 172a to the gearbox 170, a second universal joint 173b can connect a second end of the first power takeoff member 172a to the first gearbox 174a, a third universal joint 173c can connect cross shaft 171 to a first end of the second power takeoff member 172b, and a fourth universal joint 173d can connect a second end of the second power takeoff member 172b to the third gearbox 174b.

As discussed in more detail below, a first drive shaft 176a extends between and operatively connects the first gearbox 174a to a second gearbox 178a. The second gearbox 178a, in turn, is operatively connected to the first rotating line shaft, e.g., line shaft 156, that extends continuously between the first and second lateral ends of the chassis and is operably connected to at least one of the chopping units or the gathering chain drive sprockets and stalk rolls. Likewise, a second drive shaft 176b extends between and operatively connects third gearbox 174b to a fourth gearbox 178b. The fourth gearbox 178b, in turn, is operatively connected to the second rotating line shaft, e.g., line shaft 160, that extends continuously between the first and second lateral ends of the chassis and is operably connected to at least one of the chopping units or the gathering chain drive sprockets and stalk rolls.

As noted above, first drive shaft 176a extends from the first gearbox 174a to the second gearbox 178a disposed between first and second lateral ends 126, 128 of the chassis 114 of header 112 and is operably connected to rotating line shaft 156. Similarly, second drive shaft 176b extends from the third gearbox 174b to the fourth gearbox 178b disposed between first and second lateral ends 126, 128 of the chassis 114 of header 112 and is operably connected to rotating line shaft 160. More specifically, the second and fourth gearboxes are positioned about a mid region of the header and between the first and third gearboxes. As illustrated, the second gearbox 178a can be positioned proximate a midpoint of the first rotating line shaft 156, and the fourth gearbox 178b can be located proximate a midpoint of the second rotating line shaft 160. According to an aspect, line shaft 156 is continuous between the first and second lateral ends of the chassis and is e.g., operably connected to and drives the gathering chain drive sprockets and the stalk rolls of the row units 120 (FIG. 7). Similarly, line shaft 160 is continuous between the first and second lateral ends of the chassis and is e.g., operably connected to and drives the chopping units 158 (FIG. 7). Again, it will be understood that line shaft 156 may drive the chopping units 158 and that line shaft 160 may drive the gathering chain drive sprockets and the stalk rolls of the row units 120.

FIG. 8 also shows that the first drive shaft 176*a* is pivotably connected to the first and second gearboxes 174*a*, 178*a* and the second drive shaft 176*b* is pivotably connected to the third and fourth gearboxes 174*b*, 178*b*. Such pivotable connections may be achieved e.g., by way of universal joints. That is, a universal joint can connect the first drive shaft 176*a* to the first gearbox 174*a* or the second gearbox 178*a* and/or a universal joint can connect the second drive shaft 176*b* to the third gearbox 174*b* or the fourth gearbox 178*b*. According to an aspect, a first universal joint 182*a* can connect a first end of the first drive shaft 176*a* to the first gearbox 174*a*, a second universal joint 182*b* can connect a second end of the first drive shaft 176*a* to the second gearbox 178*a*, a third universal joint 182*c* can connect a first end of the second drive shaft 176*b* to the third gearbox 174*b*, and a fourth universal joint 182*d* can connect a second end of the second drive shaft 176*b* to the fourth gearbox 178*b*.

According to an aspect, the first drive shaft 176*a* is disposed at an acute angle $\alpha_a$ with respect to the first rotating line shaft 156, and the second drive shaft 176*b* is disposed at an acute angle $\alpha_b$ with respect to the second rotating line shaft 160. That is, $\alpha_a$ is defined by the angle at the intersection of the first drive shaft 176*a* axis and the axis of the first rotating line shaft 156, whereas $\alpha_b$ is defined by the angle at the intersection of the second drive shaft 176*b* axis and the axis of the second rotating line shaft 160. $\alpha_a$ and $\alpha_b$ may range from about 0 to 40 degrees, preferably about 0 to 10 degrees, and more preferably about 3 to 6 degrees.

One or more of the gearboxes 174*a*, 178*a*, 174*b* and 178*b* may be spur gearboxes, bevel gearboxes, continuously variable transmissions or chain cases as may be desired or necessary to achieve the objectives of the subject application. By way of example but not limitation, the first and second gearboxes 174*a* and 178*a* and the third and fourth gearboxes 174*b* and 178*b* can be spur gearboxes having at least two intermeshing gears. Still greater numbers of spur gears may be housed within any of the gearboxes 174*a*, 178*a*, 174*b* and 178*b*. It will be further appreciated that any combination of spur gearboxes, bevel gearboxes, continuously variable transmissions and/or chain cases may be deployed as may be appropriate. In addition, regardless of whether spur gearboxes, bevel gearboxes, continuously variable transmissions or chain cases are utilized, the number, size and arrangement of the gears within the gearboxes can be selected such that the first drive shaft 176*a* and/or the second drive shaft 176*b* can be positioned to extend in a widthwise direction of the header.

Figure 8A:
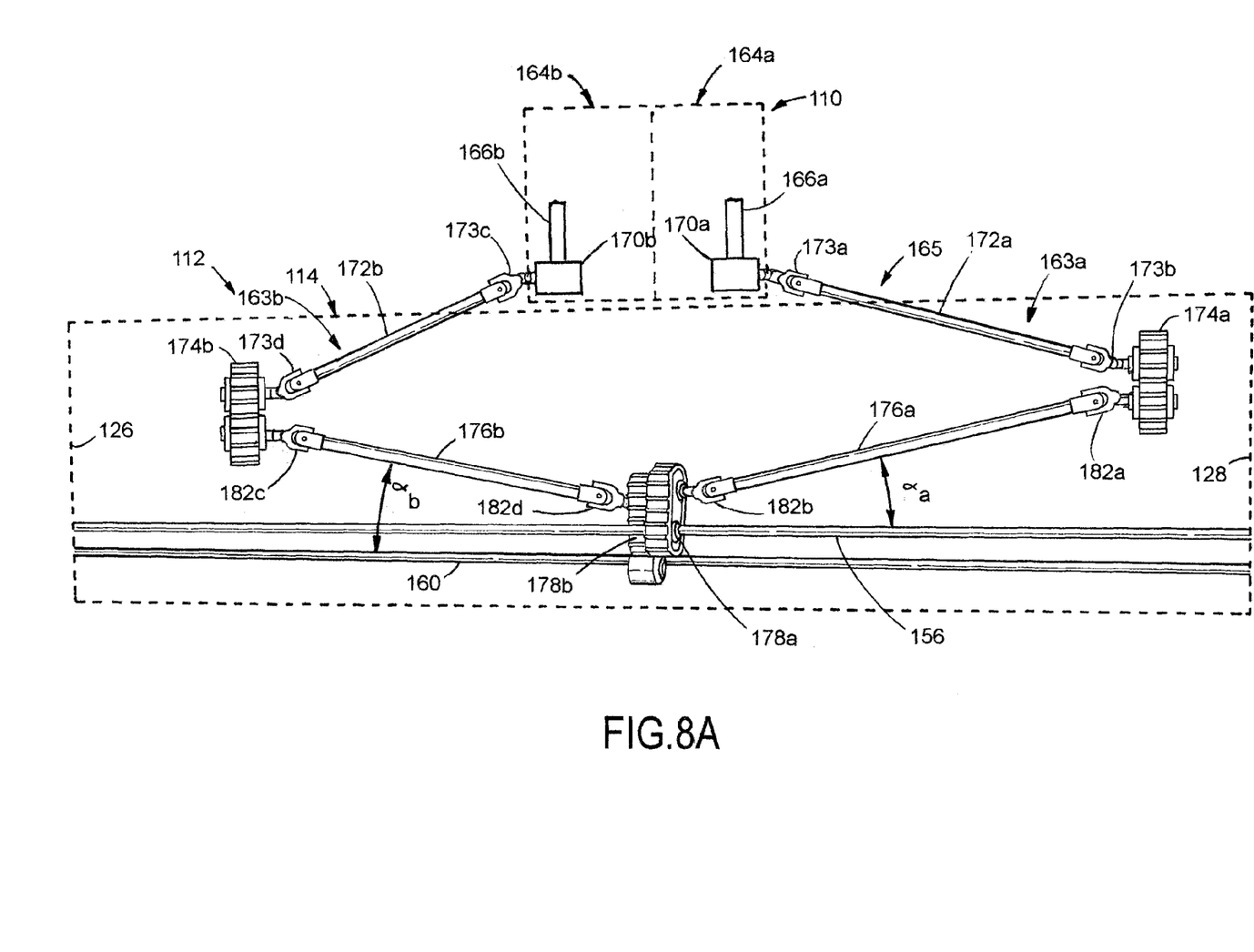
FIG. 8A is a perspective view of a drive train of a corn header constructed in accordance with a further aspect of the subject application.

As shown in FIG. 8A, it will be further understood that separate combine drive systems 164*a* and 164*b* may extend from the agricultural harvester in order to separately drive gearboxes 174*a*, 174*b*. In this regard, the combine drive system 164*a* can include a drive system member 166*a* drivingly connected to a gearbox 170*a* which drivingly rotates a first power takeoff member 172*a* connected to gearbox 174*a*. Likewise, combine drive system 164*b* can include a drive system member 166*b* drivingly connected to gearbox 170*b* which drivingly rotates a second power takeoff member 172*b* connected to gearbox 174*b*. Through power takeoff members 172*a*, 172*b*, the gearboxes 174*a* and 174*b* are respectively and operably connected to the combine drive systems 164*a*, 164*b*. Similar to the construction shown in FIG. 8, gearboxes 174*a*, 174*b* respectively rotate drive shafts 176*a*, 176*b* which drive gearboxes 178*a*, 178*b*. Gearboxes 178*a*, 178*b*, in turn, respectively drive first and second line shafts 156, 160. Universal joints 173*a*, 173*b*, 173*c* and 173*d* can connect opposite ends of the first and second power takeoff members 172*a*, 172*b* to the gearboxes 170*a*, 170*b* and the first and second gearboxes 174*a*, 174*b*. Likewise, universal joints 182*a*, 182*b*, 182*c* and 182*d* can connect opposite ends of the first and second drive shafts 176*a*, 176*b* to the first and second gearboxes 174*a*, 174*b* and the third and fourth gearboxes 178*a*, 178*b*.

In yet another aspect of the subject application, the header includes a power takeoff member and a drive assembly. The power takeoff member includes a first end operatively connected to the agricultural harvester and a second end distal to the first end. The drive assembly includes a gearbox e.g., gear box 174*a* (or alternatively 174*b*), that is operably connected to the second end of the power takeoff member. The drive assembly further includes a drive shaft e.g., drive shaft 176*a* (or alternatively 176*b*), that extends from the gearbox to a secondary gearbox e.g., 178*a* (or alternatively 178*b*) disposed between the first and second lateral ends of a chassis of the header and operably connected to a rotating line shaft e.g., first rotating line shaft 156 (or alternatively second rotating line shaft 160). The line shaft e.g., first rotating line shaft 156 (or alternatively second rotating line shaft 160) is continuous between the first and second lateral ends of the chassis and is operably connected to either the chopping units or the gathering chain drive sprockets and the stalk rolls.

In other words, first gearbox 174*a* is a gearbox operably connected to the second end of the first power takeoff member 172*a*. Second gearbox 178*a* is a secondary gearbox which is disposed proximate a midpoint of the line shaft 156 and is interconnected with the first gearbox by drive shaft 176*a*. Likewise, third gearbox 174*b* is a gearbox operably connected to the second end of the second power takeoff member 172*b*. Fourth gearbox 178*b* is a secondary gearbox which is disposed proximate a midpoint of the line shaft 160 and is interconnected with the third gearbox by drive shaft 176*b*. As discussed above, drive shafts 176*a*, 176*b* may be pivotably connected to the gear boxes 174*a*, 178*a*, 174*b* and/or 178*b* and may extend at acute angles with respect to the first and second line shafts 156, 160.

According to another aspect of the subject application and as noted above, inclusion of the chopping units is optional. Thus, the portion of the drive train leading from the second power takeoff member 172*b* to the chopping units 158 can be eliminated. In such case, the first power takeoff member 172*a* supplies power only to the row units 120 through gearbox 174*a* (or alternatively 174*b*), drive shaft 176*a* (or alternatively 176*b*), and secondary gearbox e.g., 178*a* (or alternatively 178*b*) which drives a single line shaft such as line shaft 156 or 160 that is operably connected to the row units.

According to still another aspect, the power takeoff drive assembly of the subject application may be adapted to a header construction whereby the drive train assembly described herein may be incorporated into a header to drive both the row units and chopping units of the header from a common line shaft. That is, the secondary gearbox can be positioned between the lateral ends of the header chassis and operate to rotate a line shaft that drives both the row units and the chopping units.

Figure 9A:
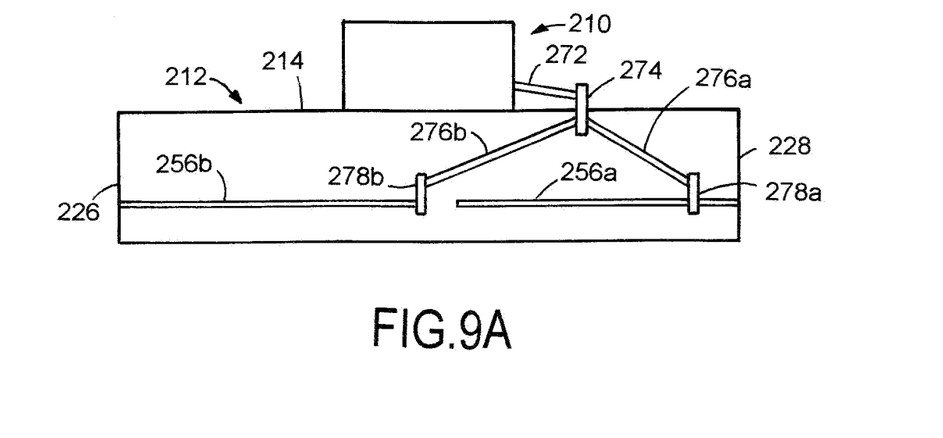
FIG. 9A is a schematic plan view of a corn header constructed in accordance with a further aspect of the subject application.

Another aspect of the subject application is depicted in FIG. 9A in which there is shown an agricultural harvester 210 to which is attached a header 212. Header 212 includes a chassis 214 having first and second lateral ends 226, 228. As shown in FIG. 9A, a power takeoff member 272 extends from the agricultural harvester 210 to a gearbox 274. The combine drive system which is in driving communication with power takeoff member 272 is omitted for clarity of illustration. First and second drive shafts 276a, 276b extend forwardly from gearbox 274 in opposite directions and are rotatably driven by gearbox 274. Distal ends of the first and second drive shafts 276a, 276b are connected to and drive secondary gearboxes 278a, 278b, respectively. Secondary gearboxes 278a, 278b, in turn, rotate line shafts 256a, 256b, respectively. Line shafts 256a, 256b may drive the moving parts of the row units, the chopping units or both the row units and the chopping units in the manner described above.

It should be noted that gearbox 278a can be situated laterally inwardly of the outer end of the line shaft 256a and the lateral end 228 of chassis 214. So constructed and arranged, gearbox 278a like gearbox 278b lies between the lateral ends of the chassis thereby producing a header having less overall width than conventional headers in which the line shaft gearboxes lie at the ends of the line shafts. Additionally, gearboxes 278a, 278b enable more power to be applied to drive line shafts 256a, 256b than conventional gearboxes located at opposite ends of the header by applying the power to a middle point of the drive line shaft.

Figure 9B:
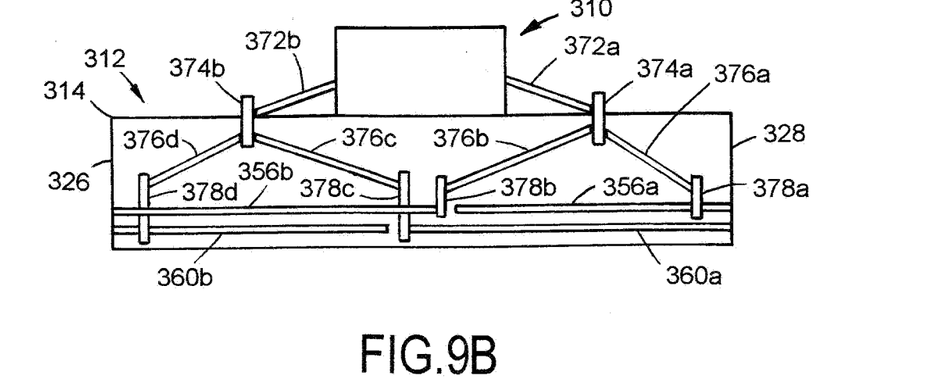
FIG. 9B is a schematic plan view of a corn header constructed in accordance with a further aspect of the subject application.

Still another aspect of the subject application is depicted in FIG. 9B in which there is shown an agricultural harvester 310 to which is attached a header 312. Header 312 includes a chassis 314 having first and second lateral ends 326, 328. As shown in FIG. 9B, power takeoff members 372a and 372b extend from the agricultural harvester 210 to gearboxes 374a and 374b, respectively. The combine drive system(s) in driving communication with power takeoff members 372a, 372b are omitted for clarity of illustration. First and second drive shafts 376a, 376b extend forwardly from gearbox 374a in opposite directions and are rotatably driven by gearbox 374a. Distal ends of the first and second drive shafts 376a, 376b are connected to secondary drive gearboxes 378a, 378b, respectively. Secondary gearboxes 378a, 378b, in turn, rotate line shafts 356a, 356b, respectively. Line shafts 356a, 356b may drive the moving parts of either the row units or the chopping units in the manner described above.

Additionally, third and fourth drive shafts 376c, 376d extend forwardly from gearbox 374b in opposite directions and are rotatably driven by gearbox 374b. Distal ends of the third and fourth drive shafts 376c, 376d are connected to and drive secondary gearboxes 378c, 378d, respectively. Secondary gearboxes 378c, 378d, in turn, rotate line shafts 360a, 360b, respectively. Line shafts 360a, 360b may drive the moving parts of either the row units or the chopping units in the manner described above.

Similar to the construction shown in FIG. 9A, secondary gearbox 378a of FIG. 9B is situated laterally inwardly of the outer end of the line shaft 356a and the lateral end 328 of chassis 314. Likewise, secondary gearbox 378d is situated laterally inwardly of the outer end of the line shaft 360b and the lateral end 326 of chassis 314. So constructed and arranged, secondary gearboxes 378a, 378d, like secondary gearboxes 378b, 378c, lie between the lateral ends of the chassis thus resulting in a header having less overall width than conventional headers in which the line shaft gearboxes lie at the ends of the line shafts. Additionally, the location of gearboxes 378a-378d interiorly of the ends of the header and the line shafts enable more power to be transmitted to the line shafts than in conventional constructions wherein the line shafts are driven by gearboxes located at the outer ends of the line shafts.

It will be appreciated by those skilled in the art that changes could be made to the embodiments described above without departing from the broad inventive concept thereof. It is to be understood, therefore, that the subject application is not limited to the particular aspects disclosed, but it is intended to cover modifications within the spirit and scope of the subject application as defined by the appended claims.

We claim:

1. A header for an agricultural harvester including a drive system, the header comprising:
   a chassis;
   first and second power takeoff members each having a first end for connecting to the agricultural harvester drive system and a second end; and
   a drive assembly that includes:
      a first gearbox operably connected to the second end of the first power takeoff member;
      a first drive shaft extending from the first gearbox to a second gearbox disposed between first and second lateral ends of the chassis, the second gearbox operably connected to a first rotating line shaft proximate a midpoint of the first rotating line shaft;
      a third gearbox operably connected to the second end of the second power takeoff member; and
      a second drive shaft extending from the third gearbox to a fourth gearbox disposed between the first and second lateral ends of the chassis, the fourth gearbox proximate the second gearbox and operably connected to a second rotating line shaft, wherein at least one of the first and second rotating line shafts is continuous between the first and second lateral ends of the chassis.

2. The header of claim 1, further comprising a plurality of row units carried by the chassis, each row unit including:
   deck plates defining a crop receiving gap therebetween;
   a gathering chain drive sprocket rotatably carried by the row unit above the deck plates; and
   a stalk roll rotatably carried by the row unit beneath the deck plates,
   wherein the first rotating line shaft drives the gathering chain drive sprockets and the stalk rolls.

3. The header of claim 1, wherein the second gearbox and the fourth gearbox are positioned between the first and third gearboxes.

4. The header of claim 1, wherein the first gearbox, the second gearbox, the third gearbox and the fourth gearbox is a spur gearbox, a bevel gearbox, a continuously variable transmission or a chain case.

5. The header of claim 1, wherein the first drive shaft is disposed at an acute angle with respect to the first rotating line shaft, and the second drive shaft is disposed at an acute angle with respect to the second rotating line shaft.

6. The header of claim 1, further comprising a universal joint connecting the first drive shaft to the first gearbox or the second gearbox, or the second drive shaft to the third gearbox or the fourth gearbox.

7. The header of claim 1, wherein the first drive shaft is pivotably connected to the first and second gearboxes and the second drive shaft is pivotably connected to the third and fourth gearboxes.

8. The header of claim 1, further comprising a first universal joint connecting a first end of the first drive shaft to the first gearbox, a second universal joint connecting a second end of the first drive shaft to the second gearbox, a third universal joint connecting a first end of the second drive shaft to the third gearbox, and a fourth universal joint connecting a second end of the second drive shaft to the fourth gearbox.

9. The header of claim 1, wherein the first rotating line shaft is continuous between the first and second lateral ends of the chassis and operably connected to gathering chain drive sprockets and stalk rolls.

10. The header of claim 1, wherein the second rotating line shaft is continuous between the first and second lateral ends of the chassis and operably connected to chopping units.

11. A header for an agricultural harvester including a drive system, the header comprising:
- a chassis having first and second lateral ends;
- a power takeoff member having a first end for connecting to the agricultural harvester drive system and a second end; and
- a drive assembly that includes:
  - a gearbox operably connected to the second end of the power takeoff member; and
  - a drive shaft extending from the gearbox to a secondary gearbox disposed between the first and second lateral ends of the chassis and operably connected to a rotating line shaft proximate a midpoint of the rotating line shaft, wherein the rotating line shaft is operatively connected to at least one of a row unit and a chopping unit, wherein a longitudinal axis of the drive shaft is disposed at an acute angle with respect to a longitudinal axis of the rotating line shaft extending laterally from a center of the header, the acute angle lying in a plane defined by the drive shaft and rotating line shaft.

12. The header of claim 11, wherein the rotating line shaft is operatively connected to a plurality of row units carried by the chassis, each row unit including deck plates defining a crop receiving gap therebetween, a gathering chain drive sprocket rotatably carried by the row unit above the deck plates, and a stalk roll rotatably carried by the row unit beneath the deck plates, wherein the rotating line shaft is operable to drive at least one of the gathering chain drive sprockets and stalk rolls of the row units.

13. The header of claim 11, wherein the rotating line shaft is operatively connected to a plurality of chopping units carried by the chassis adjacent a plurality of row units, the plurality of chopping units including blades configured to span the crop receiving gaps, wherein the rotating line shaft is operable to drive the chopping units.

14. The header of claim 11, wherein the line shaft is continuous between the first and second lateral ends of the chassis and is operably connected to either the chopping unit or the row unit.

15. The header of claim 11, wherein the drive shaft is pivotably connected to the gearbox or the secondary gearbox.

16. An agricultural harvester comprising:
- a drive system; and
- a header that includes:
  - a chassis having first and second lateral ends;
  - a plurality of row units carried by the chassis, each row unit including deck plates defining a crop receiving gap therebetween, a gathering chain drive sprocket rotatably carried by the row unit above the deck plates, and a stalk roll rotatably carried by the row unit beneath the deck plates;
  - a plurality of chopping units carried by the chassis adjacent the row units including blades configured to span the crop receiving gaps;
  - first and second power takeoff members each having a first end operatively connected to the agricultural harvester drive system and a second end; and
  - a drive assembly that includes:
    - a first gearbox operably connected to the second end of the first power takeoff member;
    - a first drive shaft extending from the first gearbox to a second gearbox disposed between the first and second lateral ends of the chassis, the second gearbox operably connected proximate to a midpoint of a first rotating line shaft that drives at least one of the gathering chain drive sprockets and the stalk rolls, wherein the first rotating line shaft spans from adjacent the first lateral end of the chassis to adjacent the second lateral end of the chassis;
    - a third gearbox operably connected to the second end of the second power takeoff member; and
    - a second drive shaft extending from the third gearbox to a fourth gearbox disposed between the first and second lateral ends of the chassis, the fourth gearbox operably connected proximate the second gearbox and to a second rotating line shaft that drives the chopping units, wherein the second rotating line shaft spans from adjacent the first lateral end of the chassis to adjacent the second lateral end of the chassis.

17. The header of claim 1, wherein the first drive shaft extends from the second gearbox laterally toward the first gearbox.

* * * * *